(12) United States Patent
Delehouze et al.

(10) Patent No.: US 10,995,038 B2
(45) Date of Patent: May 4, 2021

(54) METHOD FOR MANUFACTURING AN ACOUSTIC ATTENUATION PANEL MADE OF AN OXIDE CERAMIC-MATRIX COMPOSITE MATERIAL

(71) Applicant: Safran Nacelles, Gonfreville l'Orcher (FR)

(72) Inventors: Arnaud Delehouze, Sainneville sur Seine (FR); Sylvain Sentis, Le Havre (FR); Bertrand Desjoyeaux, Sainte Adresse (FR); Marc Versaevel, Le Havre (FR); Frédéric Fosse, Notre Dame-du-Bec (FR)

(73) Assignee: Safran Nacelles, Gonfreville l'Orcher (FR)

( * ) Notice: Subject to any disclaimer, the term of this patent is extended or adjusted under 35 U.S.C. 154(b) by 376 days.

(21) Appl. No.: 15/878,432

(22) Filed: Jan. 24, 2018

(65) Prior Publication Data

US 2018/0230063 A1 Aug. 16, 2018

Related U.S. Application Data

(63) Continuation of application No. PCT/FR2016/051934, filed on Jul. 25, 2016.

(30) Foreign Application Priority Data

Jul. 24, 2015 (FR) .................................. 15/57086

(51) Int. Cl.
*C04B 35/64* (2006.01)
*C04B 35/80* (2006.01)
(Continued)

(52) U.S. Cl.
CPC ............ *C04B 35/803* (2013.01); *B32B 18/00* (2013.01); *C04B 35/62886* (2013.01);
(Continued)

(58) Field of Classification Search
CPC . C04B 35/803; C04B 35/62886; C04B 35/64; C04B 2235/5256;
(Continued)

(56) References Cited

U.S. PATENT DOCUMENTS 3,966,522 A * 6/1976 Hatch .................... B29C 70/16
156/148
5,198,282 A * 3/1993 Baker ...................... B32B 5/26
257/E39.018
(Continued)

FOREIGN PATENT DOCUMENTS

| EP | 2472509 | 7/2012 |
|----|---------|--------|
| FR | 2852003 | 9/2004 |

(Continued)

OTHER PUBLICATIONS

International Search Report for International Application PCT/FR2016/051934, dated Nov. 10, 2016.

*Primary Examiner* — Alison L Hindenlang
*Assistant Examiner* — Andrés E. Behrens, Jr.
(74) *Attorney, Agent, or Firm* — Burris Law, PLLC

(57) ABSTRACT

A method for producing an acoustic attenuation panel from a composite material with a ceramic oxide matrix is provided that includes draping a plurality of plies having fibrous reinforcements including fibers of ceramic material in a mold to define a first skin, depositing blocks made of fugitive material on the first skin such that a space between two blocks is defined, and draping a second plurality of plies on a surface formed by the blocks such that a second skin is defined. Rounded corners of the blocks define radii for connecting the first and second skins with walls of a honeycomb core of the acoustic panel. The method further includes using a liquid medium to infiltrate the skins and spaces with a precursor of a ceramic phase, removing the (Continued)

liquid medium by evaporation or polymerization, and sintering to consolidate the ceramic oxide material and removal the fugitive material.

15 Claims, 3 Drawing Sheets

(51) Int. Cl.
    *F02K 1/82*     (2006.01)
    *G10K 11/162*     (2006.01)
    *F02C 7/045*     (2006.01)
    *B32B 18/00*     (2006.01)
    *C04B 37/00*     (2006.01)
    *C04B 35/628*     (2006.01)
    *C04B 35/71*     (2006.01)
    *C04B 35/74*     (2006.01)
    *C04B 35/76*     (2006.01)
    *C04B 35/84*     (2006.01)

(52) U.S. Cl.
    CPC ............ *C04B 35/64* (2013.01); *C04B 37/005* (2013.01); *F02C 7/045* (2013.01); *F02K 1/827* (2013.01); *G10K 11/162* (2013.01); *C04B 2235/5256* (2013.01); *C04B 2235/6028* (2013.01); *C04B 2235/616* (2013.01); *C04B 2237/06* (2013.01); *C04B 2237/064* (2013.01); *C04B 2237/34* (2013.01); *C04B 2237/343* (2013.01); *C04B 2237/38* (2013.01); *C04B 2237/592* (2013.01); *C04B 2237/597* (2013.01); *F05D 2220/323* (2013.01); *F05D 2230/31* (2013.01); *F05D 2250/283* (2013.01); *F05D 2260/963* (2013.01); *F05D 2300/6033* (2013.01); *Y02T 50/60* (2013.01)

(58) Field of Classification Search
    CPC ....... C04B 2235/6028; C04B 2235/616; F02K 1/827; G10K 11/162; F05D 2220/323; F05D 2230/31; F05D 2260/963; F05D 2300/6033
    See application file for complete search history.

(56) References Cited

U.S. PATENT DOCUMENTS

| | | | |
|---|---|---|---|
| 5,246,520 A * | 9/1993 | Scanlon | ............... B29C 70/504 156/245 |
| 2003/0059577 A1 * | 3/2003 | Morrison | .................. B32B 3/18 428/166 |
| 2006/0025514 A1 | 2/2006 | Miyamoto | |

FOREIGN PATENT DOCUMENTS

| | | |
|---|---|---|
| WO | 2013/153326 | 10/2013 |
| WO | 2014/118216 | 8/2014 |

* cited by examiner

METHOD FOR MANUFACTURING AN ACOUSTIC ATTENUATION PANEL MADE OF AN OXIDE CERAMIC-MATRIX COMPOSITE MATERIAL

CROSS-REFERENCE TO RELATED APPLICATIONS

This application is a continuation of International Application No. PCT/FR2016/051934, filed on Jul. 25, 2016, which claims priority to and the benefit of FR 15/57086 filed on Jul. 24, 2015. The disclosures of the above applications are incorporated herein by reference.

FIELD

The present disclosure relates to the field of the acoustic panels intended to equip a cone for ejecting gases of an aircraft turbojet engine. More specifically, the present disclosure concerns a method for manufacturing an acoustic attenuation panel made of a ceramic-matrix composite material, as well as an acoustic attenuation panel obtained by said method.

BACKGROUND

The statements in this section merely provide background information related to the present disclosure and may not constitute prior art.

As known per se, and shown in the attached FIG. 1, it is generally appropriate to provide for an ejection cone 1 at the rear of an aircraft turbojet engine in order to, on the one hand, optimize the flow of hot gases expelled by the turbojet engine and, on the second hand, absorb at least part of the noise generated by the rotation of the turbines of the turbojet engine and the flow of the expelled hot gases.

In this FIG. 1, the upstream and the downstream (relative to the flow direction of the exhaust gases of the turbojet engine) are respectively located on the left and on the right of the figure.

This cone is intended to be positioned downstream of the turbine of the turbojet engine, concentrically to a shroud, or "nozzle" 3, itself fastened on the downstream edge of the combustion chamber of the turbojet engine.

More precisely, the ejection cone 1 comprises, per se, a front cone portion 5 (often designated by "front plug"), of a substantially cylindrical shape, and a cone rear portion 7 (often designated by "rear plug"), of a conical shape.

The front portion 5 may be in particular acoustic or monolithic stiffened. In the case where the front portion 5 is acoustic, this means that it comprises at least one sandwich-type peripheral acoustic attenuation structure comprising at least one resonator operating according to the Helmholtz principle, formed with cavities (for example of the honeycomb type), covered with a perforated outer skin and a solid inner skin.

Moreover, the outer skin constitutes an aerodynamic guide surface of the flow of the ejected hot gases (sheet metal) of the front portion 5 of the ejection cone.

These two portions of the ejection cone may typically be formed by metal alloy sheets of an Inconel® 625 nickel alloy or a TIMETAL® 21S titanium alloy.

However, in order to reduce the mass of the cone, the use of acoustic attenuation panels made of ceramic-matrix composites (CMC) are often preferred to that of the metal acoustic attenuation panels.

The use of these composites also allows offering a better holding over time of panels which are durably exposed to high temperatures.

It is known in particular from the document WO 2014/118216 a method for manufacturing an acoustic attenuation panel made of a composite material, more particularly made of a ceramic-matrix composite (CMC) material, which material is in particular resistant to high temperatures which may exceed 600 degrees Celsius and reach in some cases the 1000 degrees Celsius, these temperatures meet in particular at the cone for ejecting the hot gases of the turbojet engine.

SUMMARY

The present disclosure aims to simplify and reduce the manufacturing cost of the panels made of CMC, and relates to this end to a method for manufacturing an acoustic attenuation panel made of a ceramic-matrix composite material comprising the following steps:

at step A, draping, in a mold, a plurality of plies constituted of fibrous reinforcements comprising fibers of a ceramic material defining a first skin of the acoustic attenuation panel;

at step B, depositing, on the first skin, a plurality of blocks of a first material, called fugitive material, so as to define at least one space between two of said blocks, the corners of said blocks being rounded;

at step C, draping, on the surface constituted by the blocks, a plurality of plies constituted of fibrous reinforcements comprising fibers of a ceramic material so as to define a second skin of the acoustic attenuation panel;

at step D, defining, via the corners of said blocks, connecting radii of said first and second skins with walls of a cellular core of the acoustic panel;

at step E, infiltrating, with a liquid medium, the precursor of the ceramic phase through said skins and in said at least one space separating said fugitive material blocks;

at step F, proceeding to the elimination of the liquid medium by evaporation or polymerization; and at step G, proceeding to the sintering of the assembly, at a temperature allowing the consolidation of the oxide ceramic material and the elimination of the fugitive material.

Thus, the manufacturing method according to the present disclosure allows obtaining a panel made of a ceramic-matrix composite material in which the cellular core is manufactured at the same time as the skins and their assembling, which allows avoiding the prior manufacture of the cellular structure, as well as the assembling thereof with the skins of the composite panel. Furthermore, the shape of a radius for connecting the first and second skins with the walls of the honeycomb core of the acoustic panel allows, with little material, conferring the acoustic attenuation panel a high resistance.

According to other optional features of the method according to the present disclosure, taken separately or in combination:

two block stages made of a fugitive material, connected and aligned or not via a plurality of protuberances also made of a fugitive material, are deposited, creating after the sintering step, a septum made of a ceramic material whose thickness can be modulated according to the acoustic need;

after step B, ceramic fibers are added into the inter-block space in order to manufacture a septum made of ceramic-matrix composite;

after step B, at least one fibrous reinforcement woven or not, continuous or not, made of a ceramic material is disposed between said fugitive material blocks;

said blocks inserted in step B have diverse and various geometries allowing to guarantee an acoustic attenuation power;

said blocks made of fugitive material integrate lateral protuberances of variable sizes, which will define the spacing between the blocks and therefore the thickness of the walls after sintering;

one of said skins of the acoustic panel is perforated, so as to create acoustic holes;

at least one fugitive material block comprises a plurality of protuberances made of fugitive material positioned on said block so as to form, after the step of sintering the assembly, a plurality of acoustic holes in the second skin of the acoustic panel;

the method comprises, before step G and in one form before step E, an additional step in which a plate is deposited, having a plurality of protuberances made of a fugitive material positioned so that the protuberances pass integrally through the plies of fibrous reinforcements of one of said skins in order to form, after the step of sintering the assembly, a plurality of acoustic holes;

a plurality of protuberances made of a material capable of resisting the sintering step, is integrated with one of the molding surfaces of the tooling, in order to form a plurality of acoustic holes in one of said skins;

at least one block made of fugitive material has a shaped geometry to define, after the sintering step of the assembly, at least one communication channel between the cells of the acoustic attenuation panel, allowing the drainage of liquids being able to penetrate the panel when said panel is in service situation;

said skins comprise a metal-oxide fibrous reinforcement and a metal-oxide matrix; and at least two different ceramic materials are used for the matrix and the fibrous reinforcement of said skins. Thus, the local features of the acoustic panel are adapted according to the constraints.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
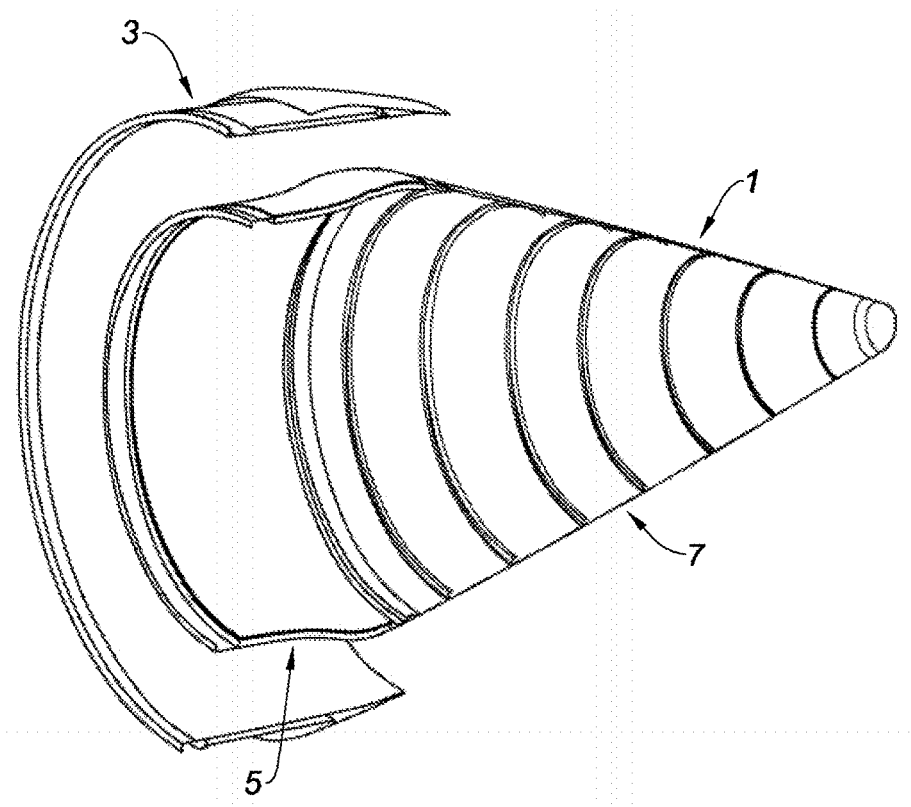
FIG. 1 shows an ejection cone according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
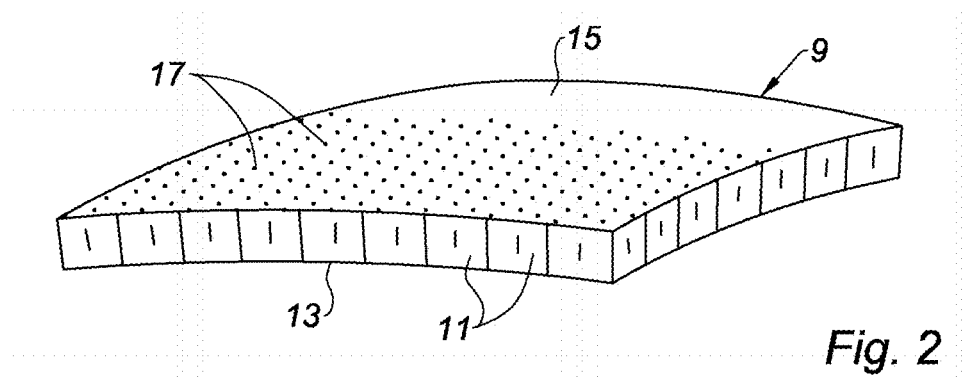
FIG. 2 illustrates a perspective view of an acoustic panel obtained by a method according to the present disclosure.

With reference to FIG. 2, an acoustic panel 9 obtained by the method of the present disclosure can be seen.

This acoustic panel 9 includes a plurality of cells 11 taken between a solid skin 13 and a perforated skin 15 provided with a plurality of holes 17 opening into the cells 11.

As known per se, the perforated skin 15 is intended to be located on the side where the noise source desired to be attenuated is located, this noise penetrating through the orifices 17 inside the cells 11 and thereby undergoing an attenuation (Helmholtz resonator).

In the scope of the present disclosure, the cells 11 and the two skins 13, 15 are formed of a ceramic-matrix composite (CMC).

As known per se, such a material comprises a fibrous texture taken in a ceramic-matrix.

By way of example, the fibers forming the preform may be made of carbon, carbide or metal oxide. The ceramic forming the matrix may be made of carbon or silicon carbide, but most often may be an alumina-based ceramic, these examples being of course in no way restrictive.

Figure 3:
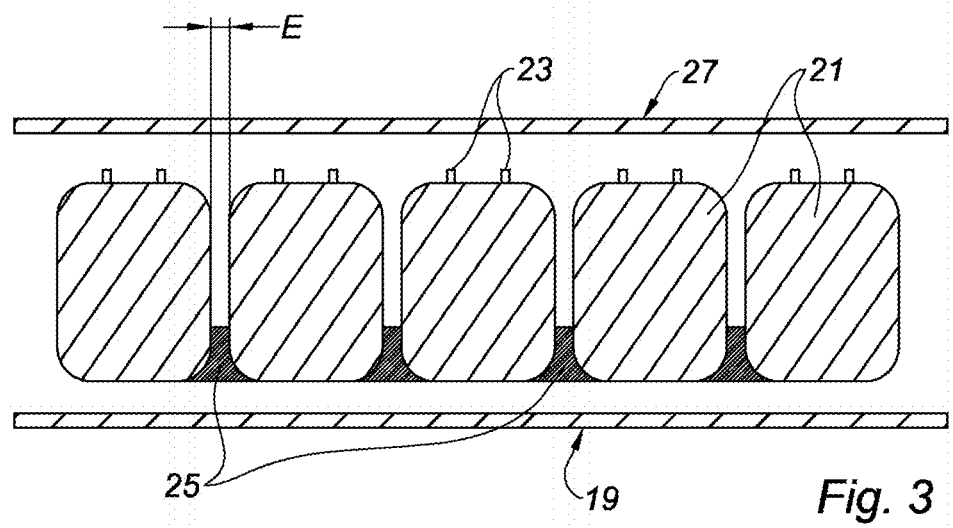
FIG. 3 illustrates a sectional view of the acoustic panel of FIG. 2 during manufacture.

FIG. 3 allows understanding how the method according to the present disclosure leads to the acoustic panel shown in FIG. 2.

Indeed, as seen in this FIG. 3, a plurality of plies constituted of fibrous reinforcement, comprising fibers of a ceramic material, are first draped inside a mold so as to form a layer 19, itself intended to form the solid skin 13.

A plurality of blocks 21 made of a material called "fugitive" material is then deposited on this first layer 19, the geometry of these blocks defining complementary (or "negative") volumes defined by the cells 11, the spaces E which separate these blocks constitute the positive volumes of the walls of the cellular core.

As seen in FIG. 3, the corners of said blocks are rounded. This allows defining, via the corners of the blocks, connecting radii of the first and second skins with walls of a cellular core of the acoustic panel. The connecting radius forms the equivalent of a convex meniscus on each side of the fugitive material block. The shape of a radius for connecting the first and second skins with the walls of the cellular core of the acoustic panel allows, with little material, giving the acoustic attenuation panel a high resistance.

It should be noted that the fugitive material forming blocks 21 may be any material capable of disappearing during the sintering operation. It is possible to use in particular thermoplastic (polyethylene or other) or thermosetting (for example epoxy-based) materials for this fugitive material, or a low melting point metal (for example lead, aluminum or tin-based metal). The elimination of the fugitive material during the sintering will be at least partial or total. This elimination will be done in particular by combustion, oxidation, melting, evaporation or sublimation.

According to a first possible variant, the blocks 21 are surmounted by pins 23 also made of fugitive material defining volumes corresponding to the holes 17 of the acoustic skin 15.

In one form, bridges 25 are made between at least some of the blocks 21, in the portion of these blocks located opposite to that of where the pins 23 are located.

Figure 4:
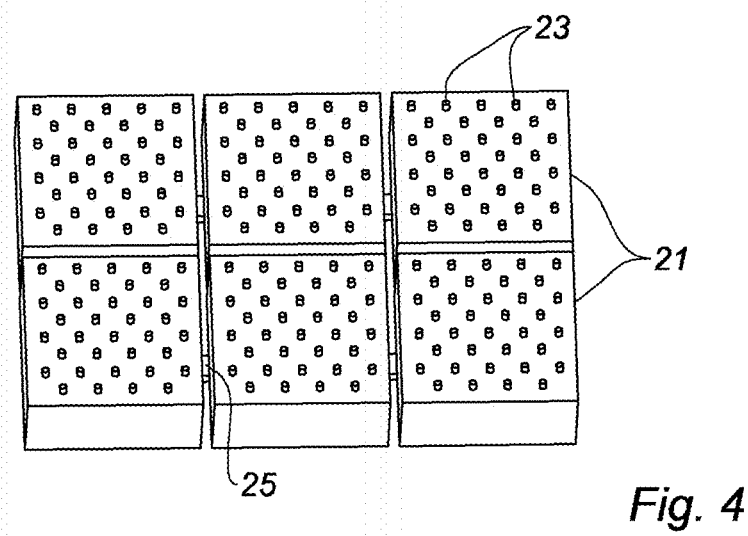
FIG. 4 illustrates a top perspective view of fugitive material blocks involved in a method according to the present disclosure.
Figure 5:
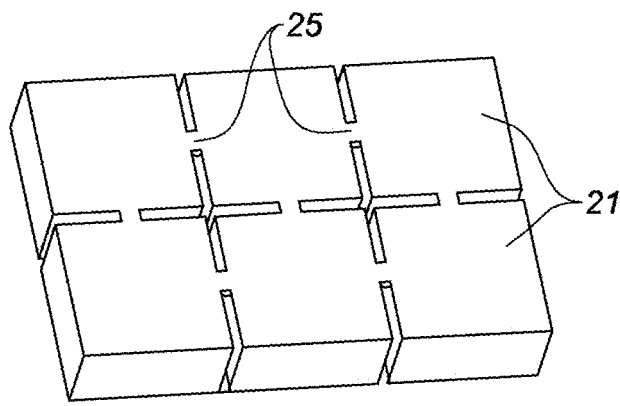
FIG. 5 is a bottom perspective view of the fugitive material blocks of FIG. 4.

These blocks 21, surmounted where appropriate by their pins 23 and interconnected by the bridges 25, are in particular seen in the perspective views of FIGS. 4 and 5 respectively.

Once the blocks 21 have been deposited on the first fiber layer made of ceramic material 19, these blocks are covered with a second layer made of ceramic material fibers 27 intended to form the acoustic skin 15.

Optionally, it will be noted that fibers or any other fibrous reinforcement made of ceramic material may also be inserted into the spaces E separating the blocks 21.

The two layers 19, 27 and the blocks 21 thus arranged inside the mold intended to give the acoustic panel its final shape, the assembly thus made is infiltrated by a medium transporting the precursor of the ceramic phase.

According to a first variant, this medium may comprise a preceramic-matrix (ceramic precursor resin).

According to a second variant, this medium may comprise a suspension containing the ceramic particles.

This liquid medium thus impregnates the two fiber layers 19, 27, and is installed in the interstices defined by the spaces E separating the fugitive material blocks 21.

This impregnation also applies to the ceramic fibers 5 arranged in the spaces E when this option is selected.

The media transporting the precursor of the ceramic phase is then eliminated, by evaporation (case of a suspension containing the ceramic particles) or by polymerization (case of a ceramic precursor resin), allowing to obtain a first consolidation of the two layers 19, 27 as well as possibly fibers arranged in the spaces E.

The next step includes taking out the thus dried assembly from the filtration tooling thereof, then subjecting it to a very high temperature rise (in the order of 1000 degrees Celsius), so as to carry out the sintering of the ceramic impregnating the aforementioned ceramic fibers.

Alternatively, and if the filtration tooling allows it, the sintering step might be carried out by leaving the dried assembly in the filtration tooling thereof.

During this operation, the fugitive material forming the blocks 21, the pins 23 (where appropriate) and the bridges 25 will undergo an oxidation/combustion or will sublimate, and escape toward the outside of the mold through the holes formed by the pins, or by specific evacuation holes located at the low point of the solid skin.

Figure 6:
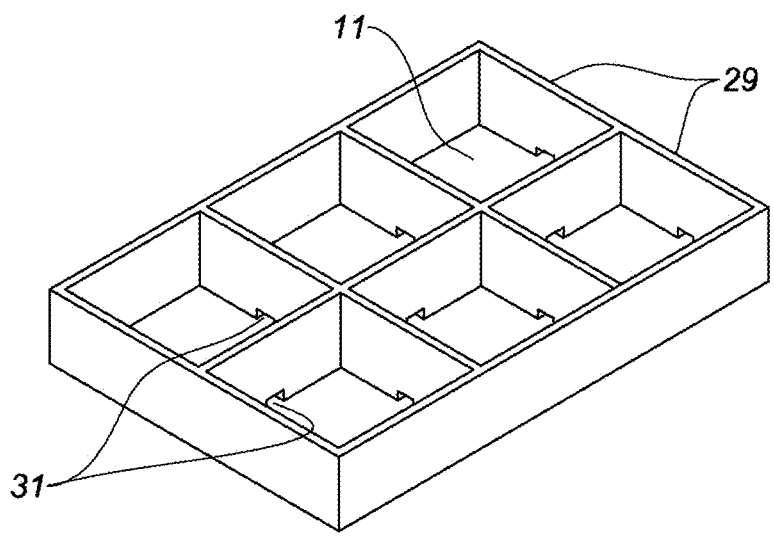
FIG. 6 illustrates cells made of a ceramic-matrix composite made by a method according to the present disclosure.

These blocks 21, these pins 23 (where appropriate) and these bridges 25 having disappeared, only their complementary volumes remain in the thus obtained acoustic panel, that is to say walls 29 (FIG. 6) instead of the spaces E separating the fugitive blocks 21 from the holes 17 in the skin 9 instead of the pins 23 (where appropriate), and passages 31 between the cells 11 formed in the walls 29, instead of the bridges 25.

These passages 31 allow the drainage of liquids likely to penetrate into the cells of the acoustic panel when said acoustic panel is in service.

It is understood in the light of the above that the method according to the present disclosure allows obtaining in an extremely simple manner an acoustic absorption panel made of ceramic-matrix composite.

Another possible solution for making holes 17 in the acoustic skin 15, is to use a plate 33 (see FIG. 7) provided with a plurality of pins 23, these pins corresponding to the holes 17.

This plate is applied against the second fiber layer 27, before the sintering operation, and in one form before the filtration step or the polymerization step.

According to a first option, this plate 33 may also be formed of a fugitive material in which case it disappears during the sintering operation, leaving room for the holes 17.

According to a second option, this plate can be made of a material resistant to sintering temperatures, in which case it may be part of the mold and be reused for the manufacture of the following acoustic panel, and the inserts should have a demoldable form.

It will be noted that the geometry of the blocks 21, the pins 23 and the bridges 25, may of course be adapted depending on the needs, such as, for example, cylinder, or parallelepiped, among others, the size thereof is also a function of the desired technical specifications.

It will be also noted that, according to another possible variant, the holes 17 may be made subsequently to the sintering operation by an appropriate drilling tooling.

Figure 8:
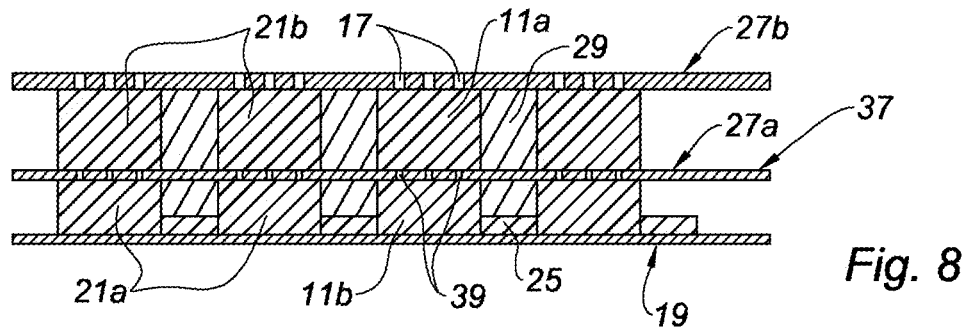
FIG. 8 illustrates a sectional view of a double-stage acoustic panel (DDOF) made by a method according to the present disclosure.

Now, with reference to FIG. 8, a sectional view of a two-stage acoustic panel (commonly designated by "DDOF", as opposed to the single-stage acoustic panel "SDOF" presented above) can be seen.

Such a two-stage acoustic panel comprises, in addition to the members already presented in relation to the single-stage panel and designated by the same references, an intermediate layer 37 often designated by the term "septum", dividing the cells 11 in their height direction into two half-cells 11a, 11b, this intermediate layer 37 itself being provided with holes 39 allowing an acoustic communication between the two half-cells 11a, 11b.

To make this two-stage acoustic panel by the method according to the present disclosure, we proceed similarly to what has been described above relative to the single-stage panel, except that we proceed according to two main steps 30.

The first step comprises arranging, on the first fiber layer 19, a first layer of fugitive material blocks 21a and, where appropriate, fibers or a fibrous material 27a, similarly to what has been described in relation to the single-stage panel.

Figure 7:
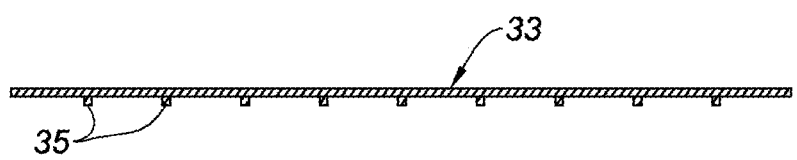
FIG. 7 illustrates a member allowing, alternatively, to make holes in an acoustic skin of a panel obtained by a method according to the present disclosure.

It should be noted that the holes 39 may be obtained by pins surmounting the first stage of blocks 21a, or by a plate 33 made of fugitive material, as shown in FIG. 7.

A second stage of blocks made of fugitive material 21b is then superimposed on the intermediate layer 27a, the shape of these blocks corresponding, but not necessarily, to that of the blocks of the first stage 21a.

These blocks 21b are finally covered with a second layer made of ceramic fibers 27b and the acoustic holes are made in this second layer 27b under the same conditions as those aforementioned in relation to the single-stage acoustic panel.

As described above, the assembly thus obtained from a liquid medium containing the precursor of the ceramic phase is infiltrated, the elimination of this medium is carried out by evaporation or polymerization, then this assembly is subjected to a sintering allowing to remove the fugitive material from the blocks 21a, 21b, the bridges 25 and the acoustic holes made in the layers 37 and 27b of fibrous material.

A two-stage acoustic panel is thereby obtained, in which the acoustic waves may penetrate the two-stage cells, through the holes 17 of the outer skin 27b, and 39 of the septum 37, thus allowing an enhanced acoustic attenuation.

Optionally, the two block stages 21a, 21b might be inserted into a single step, in which case they would be linked to each other by the pins, the assembly of these blocks and pins being in this case manufactured by additive synthesis for example.

In this solution, fibers might be placed or not between these pins, and the septum would be monolithic or composite.

Moreover, it may also be considered, contrary to what has been shown in FIG. 8, that the cavities defining the cells on either side of the septum 37, are not necessarily exactly facing each other.

Of course, the present disclosure is in no way limited to the described and shown forms, provided by way of simple examples.

Thus, this is in particular how the concept of the present disclosure might be extended to an acoustic panel in which the walls 29 of the cells 11, and the solid 13 and perforated 15 skins would be obtained by fibrous textures, such as for example fabrics, braids, knits, and felts, among others, pre-impregnated with the liquid medium containing the precursor of the ceramic phase, rather than infiltrating this medium once the fibrous textures are placed inside of the mold.

It should be noted that the plate 33 provided with the pins 35 thereof may be applied before the filtration step (for the variant with filtration of the liquid medium through the fibrous material layers) or polymerization step (for the pre-impregnation variant of the fibrous material layers).

Thus, it is also possible to use two different ceramic materials for the fibrous reinforcements but also to form said matrix, so as to obtain an acoustic panel having zones of differentiated resistances.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing an acoustic attenuation panel made of a ceramic-matrix composite material comprising:
    draping a plurality of plies comprising fibrous reinforcements of ceramic material fibers in a mold to define a first skin of the acoustic attenuation panel;
    depositing a plurality of blocks made of a fugitive material on the first skin such that at least one space is defined between two of said plurality of fugitive material blocks, wherein corners of each fugitive material block is rounded, and wherein at least one block of the plurality of blocks made of fugitive material comprises a plurality of protuberances made of fugitive material positioned on said block such that a plurality of acoustic holes in the second skin of the acoustic panel is formed after a sintering step;
    draping a plurality of plies comprising fibrous reinforcements of ceramic material fibers on a surface defined by the plurality of fugitive material blocks to define a second skin of the acoustic attenuation panel;
    defining, via the rounded corners of each fugitive material block, connecting radii of said first and second skins with walls of a cellular core of the acoustic attenuation panel;
    infiltrating, by a liquid medium, a precursor of a ceramic phase through said first and second skins and in said at least one space separating said fugitive material blocks;
    eliminating the liquid medium by evaporation or polymerization; and
    sintering at a temperature to consolidate the ceramic material and at least partially eliminate the fugitive material.

2. The manufacturing method according to claim 1 further comprising depositing a second stage of blocks made of a fugitive material after draping the second plurality of plies such that after the sintering step, a septum made of a ceramic material whose thickness can be modulated according to the acoustic need is created.

3. The manufacturing method according to claim 2, wherein the second stage of blocks are connected and aligned via a plurality of protuberances made of a fugitive material.

4. The method according to claim 1, wherein after depositing the plurality of blocks, ceramic fibers are added into an inter-block space to manufacture a ceramic-matrix composite septum.

5. The manufacturing method according to claim 1, wherein after depositing the plurality of blocks, at least one fibrous reinforcement made of a ceramic material is disposed between said fugitive material blocks.

6. The manufacturing method according to claim 5, wherein the at least one fibrous reinforcement is woven.

7. The manufacturing method according to claim 5, wherein the at least one fibrous reinforcement is continuous.

8. The manufacturing method according to claim 1, wherein said plurality of blocks made of fugitive material integrate lateral protuberances of variable sizes defining the at least one space between the blocks and defining a thickness of the walls after sintering.

9. The manufacturing method according to claim 1, wherein at least one of the first skin and the second skin of the acoustic panel is perforated, so as to create acoustic holes.

10. The manufacturing method according to claim 1 further comprising depositing a plate having a plurality of protuberances on one of the first and second skins before infiltrating the precursor or before sintering, wherein the plurality of protuberances are made of a fugitive material and pass integrally through the plies of fibrous reinforcements of the one of the first and second skins such that a plurality of acoustic holes are formed in the one of the first and second skins after the sintering step.

11. The manufacturing method according to claim 1, wherein a plurality of protuberances made of a material capable of resisting drying or the sintering step is integrated with a molding surface of a tooling to form a plurality of acoustic holes in at least one of the first skin or the second skin.

12. The method according to claim 1, wherein at least one of the plurality of blocks made of fugitive material has a shaped geometry that defines at least one communication channel between cells of the acoustic attenuation panel to allow liquids that penetrate the panel to drain.

13. The method according to claim 1, wherein said first and second skins comprise a fibrous reinforcement made of metal oxide and a matrix made of metal oxide.

14. The method according to claim 1, wherein at least two different ceramic materials are used for the matrix and the fibrous reinforcements of said first and second skins.

15. The method according to claim 1, wherein the at least one space is an empty space.

* * * * *